(12) United States Patent
Chiu et al.

(10) Patent No.: US 10,541,952 B2
(45) Date of Patent: Jan. 21, 2020

(54) RECOMMENDATION GENERATOR RESPONSIVE TO MESSAGING CONTENT

(71) Applicant: INTERNATIONAL BUSINESS MACHINES CORPORATION, Armonk, NY (US)

(72) Inventors: Po-Cheng Chiu, Taipei (TW); Jui Hsiang Huang, New Taipei (TW); Tao-Hung Jung, New Taipei (TW); Cheng-Fang Lin, New Taipei (TW); I-Chien Lin, Taipei (TW); Cheng-Lun Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 15/497,533

(22) Filed: Apr. 26, 2017

(65) Prior Publication Data

US 2018/0316635 A1 Nov. 1, 2018

(51) Int. Cl.
*G06F 17/27* (2006.01)
*H04L 12/58* (2006.01)

(52) U.S. Cl.
CPC ........ *H04L 51/046* (2013.01); *G06F 17/2765* (2013.01); *G06F 17/2785* (2013.01)

(58) Field of Classification Search
CPC . H04L 51/046; H04L 67/306; G06F 17/2785; G06F 17/2765
See application file for complete search history.

(56) References Cited

U.S. PATENT DOCUMENTS 9,306,878 B2 4/2016 Patil
2011/0320373 A1* 12/2011 Lee ................... G06Q 50/01
705/319

(Continued)

FOREIGN PATENT DOCUMENTS

WO WO2015195688 A1 12/2015

OTHER PUBLICATIONS

Peter Mell et al, The NIST Definition of Cloud Computing, National Institute of Standards and Technology, Publication 800-145, 2011.
(Continued)

*Primary Examiner* — Ario Etienne
*Assistant Examiner* — Kidest Mendaye
(74) *Attorney, Agent, or Firm* — Patrick J. Daugherty; Daugherty & Del Zoppo Co., LPA

(57) ABSTRACT

Aspects generate recommendations in response to messaging content, wherein processors are configured to identify keywords within text content extracted from a received message that are assigned to a topic leaf node within an event taxonomy and a root event node from which the topic leaf node depends; identify a plurality of recommendation items that each match a type of event of the root event node and are linked to the topic node of the identified keyword; determine, for each of the recommendation items, a sender sentiment value as a function of a preference of the sender, and a recipient sentiment value as a function of a preference of the recipient; and present to the sender and the recipient as an event recommendation a subset of the recommendation items that each satisfy a sentiment threshold for the sender sentiment value and the recipient sentiment value.

14 Claims, 5 Drawing Sheets

(56) References Cited

U.S. PATENT DOCUMENTS

| | | | |
|---|---|---|---|
| 2014/0365313 A1* | 12/2014 | Reese | G06Q 30/0269 |
| | | | 705/14.66 |
| 2015/0058148 A1* | 2/2015 | Grosz | G06Q 30/0269 |
| | | | 705/26.2 |
| 2015/0080027 A1* | 3/2015 | Amrhein | H04W 4/12 |
| | | | 455/456.3 |
| 2015/0248651 A1* | 9/2015 | Akutagawa | G06Q 10/1095 |
| | | | 705/7.19 |
| 2016/0203500 A1* | 7/2016 | Williams | G06Q 30/0203 |
| | | | 705/7.32 |
| 2018/0307748 A1* | 10/2018 | Freilinger | G06F 17/16 |

OTHER PUBLICATIONS

Loh et al, Recommendation of Complementary Material during Chat Discussions, Knowledge Management & E-Learning: An International Journal, vol. 2, No. 4, 2017.

* cited by examiner

US 10,541,952 B2

RECOMMENDATION GENERATOR RESPONSIVE TO MESSAGING CONTENT

BACKGROUND

A wide variety of communication applications ("apps") are available to users to quickly contact other users to engage in real-time conversations and discussions. Friends connect with each other using mobile chatting and social media application and messaging system applications such as Facebook Messenger®, Twitter®, Wechat®, Line®, WhatsApp®, etc. (FACEBOOK MESSENGER is a trademark of Facebook, Inc. in the United States or other countries; TWITTER is a trademark of Twitter, Inc. in the United States or other countries; WECHAT is a trademark of Tencent Holdings, Limited in the United States or other countries; LINE is a trademark of the LINE Corporation in the United States or other countries; WHATSAPP is a trademark of WhatsApp, Inc. in the United States or other countries.) These communication channels provide instant connectivity between multiple people anywhere, at any time, obviating the need to physically meet with a person to talk or otherwise engage in dialogue. While mobile communication apps executing on smart phones have become the most popular means for quickly reaching other users, the use of communication applications is generally device-independent, and personal computers, laptops, client and other programmable devices that have camera and microphone components may take part in conversations with multiple other users.

SUMMARY

In one aspect of the present invention, a computerized method for recommendation generation in response to messaging content includes executing steps on a computer processor. Thus, a computer processor is configured to extract text content from a received message in response to receipt of the message from a messaging application that is directed from a sender to a recipient within the messaging application; identify a keyword within the extracted text content that is assigned to a topic leaf node within an event taxonomy; identify a root event node within the event taxonomy from which the topic leaf node depends within the event taxonomy; identify a plurality of recommendation items that each match a type of event of the root event node and are linked to the topic node of the identified keyword; determine, for each of the recommendation items, a sender sentiment value as a function of a preference of the sender, and a recipient sentiment value as a function of a preference of the recipient; and present to the sender and the recipient as an event recommendation a subset of the recommendation items that each satisfy a sentiment threshold for the sender sentiment value and the recipient sentiment value.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to extract text content from a received message in response to receipt of the message from a messaging application that is directed from a sender to a recipient within the messaging application; identify a keyword within the extracted text content that is assigned to a topic leaf node within an event taxonomy; identify a root event node within the event taxonomy from which the topic leaf node depends within the event taxonomy; identify a plurality of recommendation items that each match a type of event of the root event node and are linked to the topic node of the identified keyword; determine, for each of the recommendation items, a sender sentiment value as a function of a preference of the sender, and a recipient sentiment value as a function of a preference of the recipient; and present to the sender and the recipient as an event recommendation a subset of the recommendation items that each satisfy a sentiment threshold for the sender sentiment value and the recipient sentiment value.

In another aspect, a computer program product for recommendation generation in response to messaging content has a computer-readable storage medium with computer readable program code embodied therewith. The computer readable hardware medium is not a transitory signal per se. The computer readable program code includes instructions for execution which cause the processor to extract text content from a received message in response to receipt of the message from a messaging application that is directed from a sender to a recipient within the messaging application; identify a keyword within the extracted text content that is assigned to a topic leaf node within an event taxonomy; identify a root event node within the event taxonomy from which the topic leaf node depends within the event taxonomy; identify a plurality of recommendation items that each match a type of event of the root event node and are linked to the topic node of the identified keyword; determine, for each of the recommendation items, a sender sentiment value as a function of a preference of the sender, and a recipient sentiment value as a function of a preference of the recipient; and present to the sender and the recipient as an event recommendation a subset of the recommendation items that each satisfy a sentiment threshold for the sender sentiment value and the recipient sentiment value.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
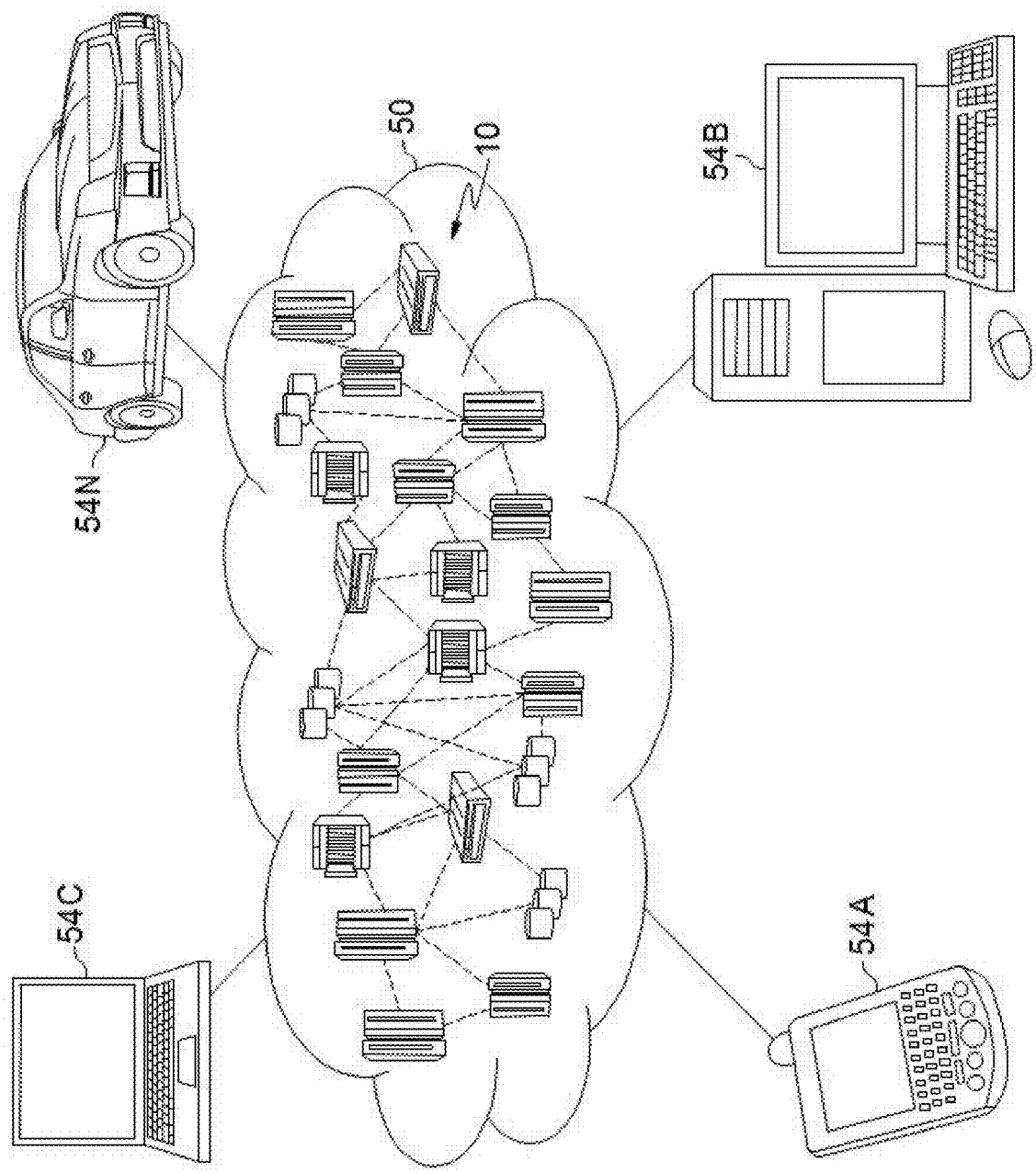
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
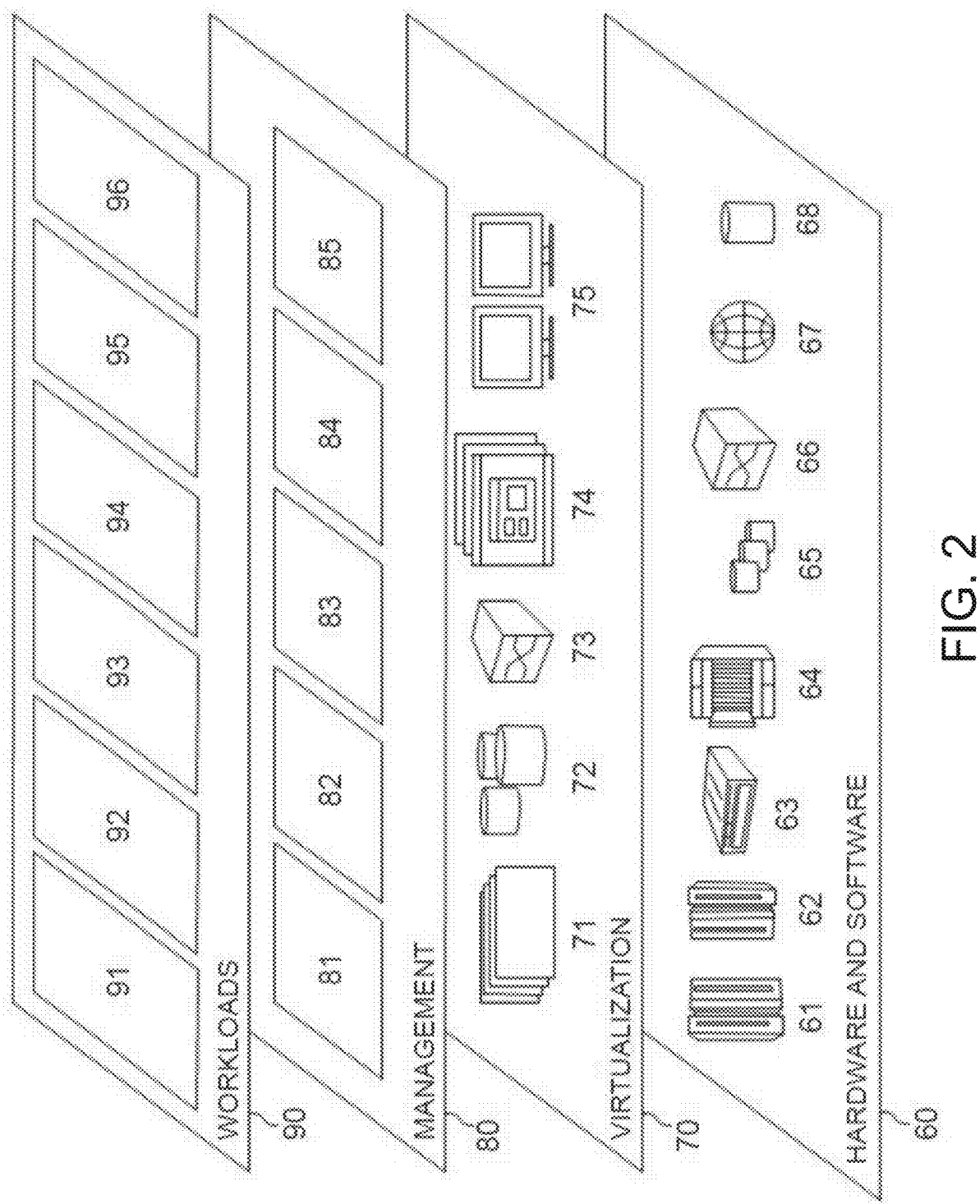
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for recommendation generation in response to messaging content 96.

Figure 3:
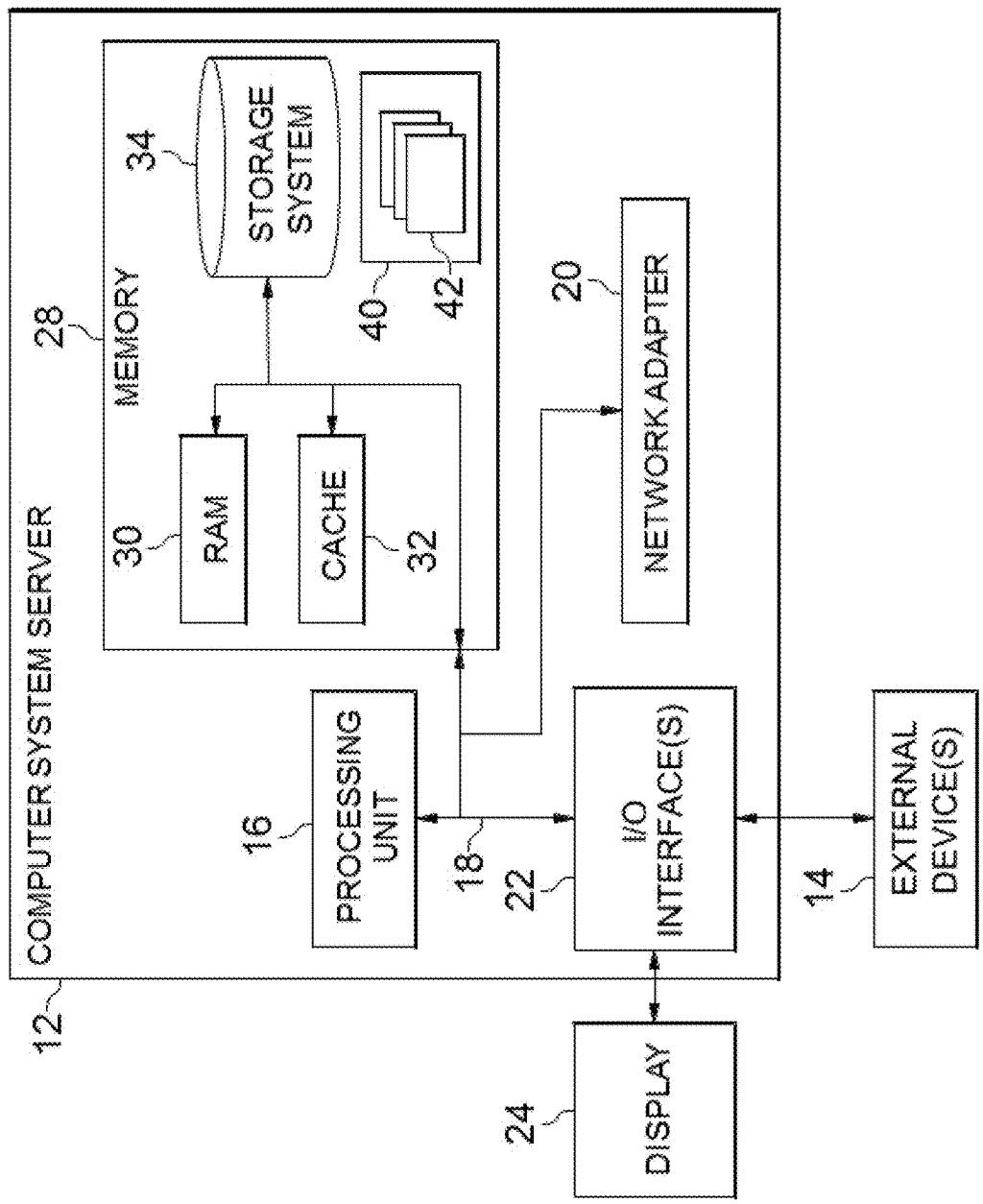
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Casual conversations between users on communication apps contain lots of useful but unstructured data or information. For example, due to their informal nature data, collected from chatting applications tends to be unorganized and contain lots of noise. Aspects of the present invention utilize text mining techniques to extract useful information from social conversation platforms (private chat rooms, instant messaging applications, etc.) and web-based social media application and messaging systems) for use in generating personalized recommendations that help facilitate decision making among the members of the group or individuals involved within a conversation.

Figure 4:
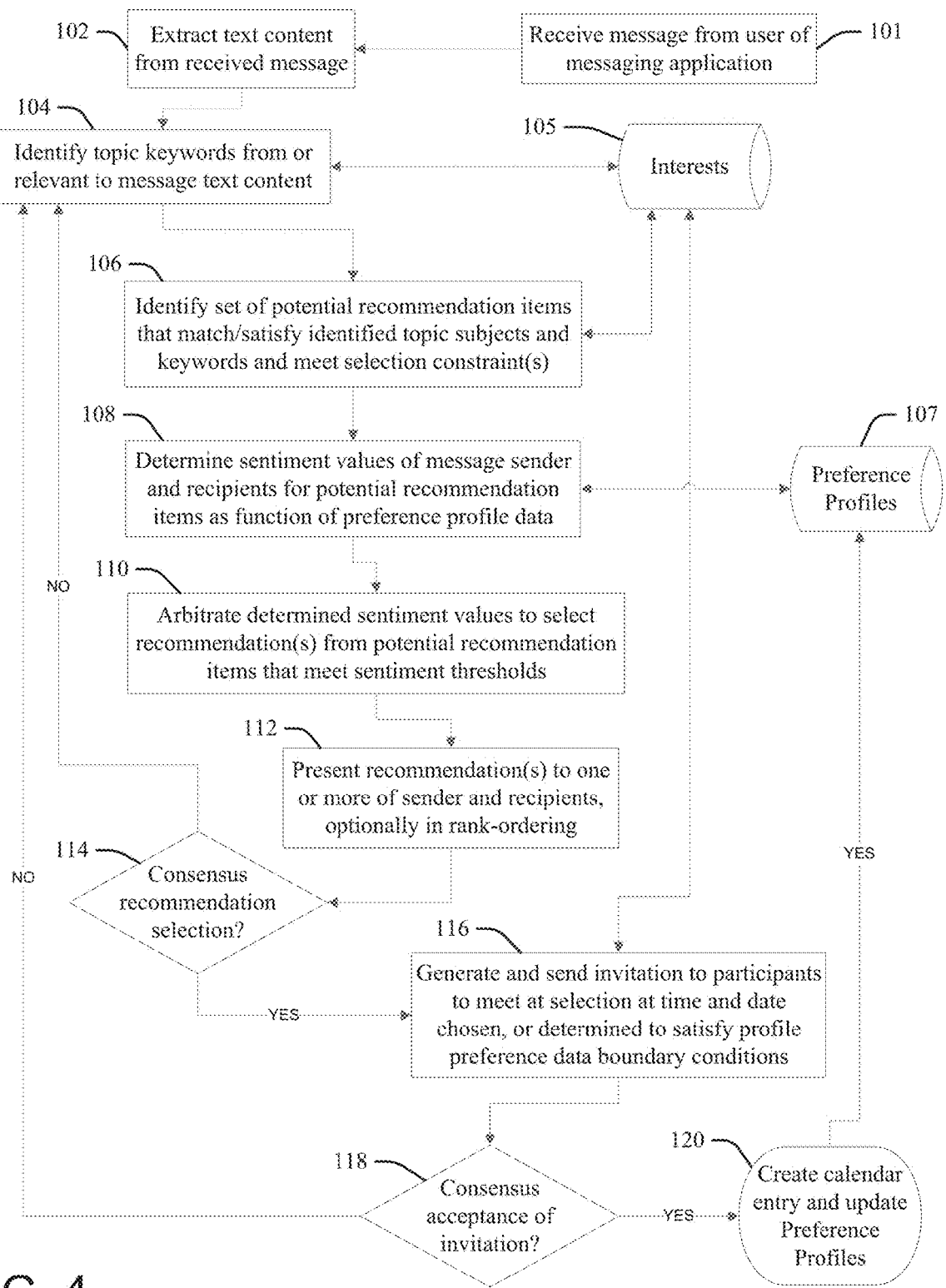
FIG. 4 is a flow chart illustration of an embodiment of the present invention.

FIG. 4 illustrates a process or system according to the present invention for automatic recommendation generation in response to messaging content. In response to receiving a message from a user of a messaging application at 101 that is directed to one or more other users of the messaging application, at 102 a processor that is configured according to an aspect of the present invention (the "configured processor") extracts text content from the received message, namely keywords, sentences, clauses or other conversation snippets or text content selections.

In one illustrative but not exhaustive example the configured processor uses a REST API service at 102 to analyze the received conversation message and generate the following JSON format output from the extracted data:

```
{
    "user_id" : "abc123@BigCorp.com",
    "display_name" : "stone",
    "time" : "1416995016",
    "message" : "Hi team, wanna eat beef noodle?",
    "app_type" : "WHATSAPP",
    "location" : {latitude: 25.1, longitude: 123.1}
};
``` wherein the "user_id" data is a unique user account identity for the user generating and sending the received message, here a unique email address "abc123@BigCorp.com"; the "display_name" data is a user name of the sender that is seen by the others users and used to identify the message sender within their respective message displays ("stone"); the "time" data is a time stamp of user submission or transmission/reception of the other users of the message ("1416995016"); the message data is an entirety of the text content of the message ("Hi team, wanna eat beef noodle?"), the "app_type" data is the specific messaging application used to convey the message to the other users ("WHATSAPP"); and the location data is a geographic location of the sender, or a desired meeting location address or general area ("{latitude: 25.1, longitude: 123.1})."

At 104 the configured processor identifies one or more topic keywords within the text content extracted at 102, and other root, event-topic keywords that are relevant (related) to the identified topic keywords via an event taxonomy defined within an Interests database repository (or cloud resource) 105.

Figure 5:
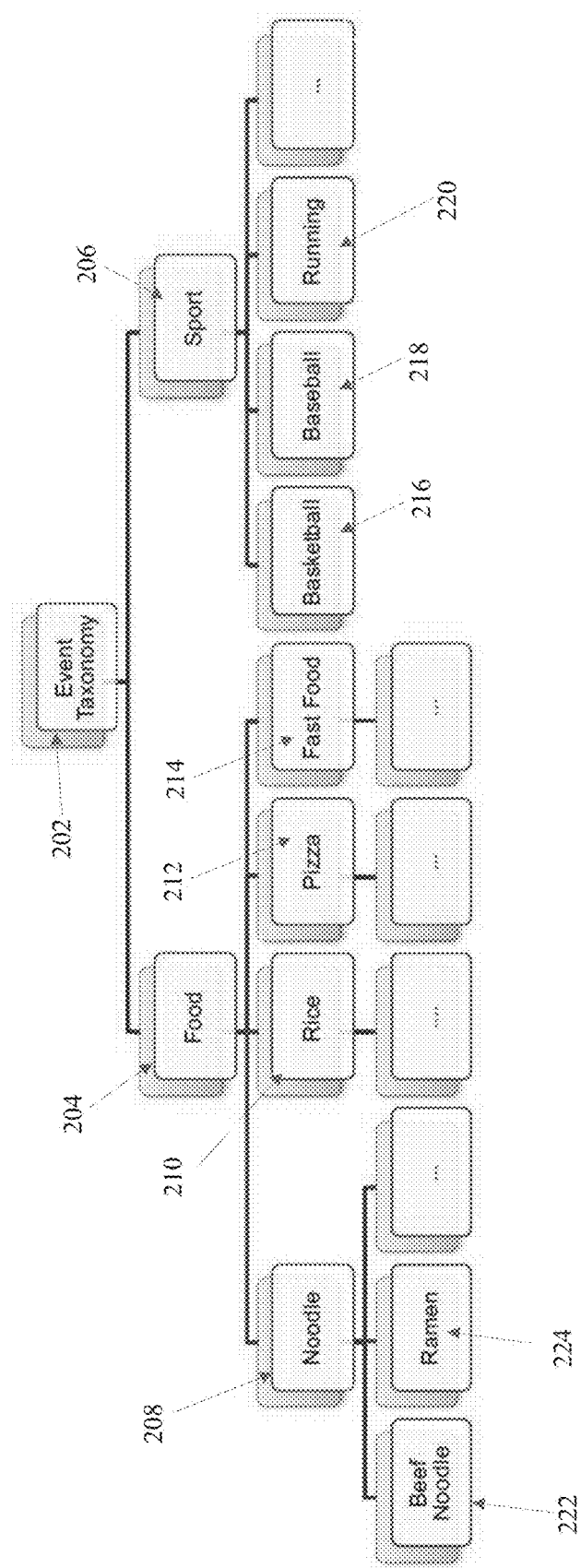
FIG. 5 is a block diagram illustration of an embodiment of the present invention.

FIG. 5 illustrates one example of an event taxonomy structure 202 according to the present invention that defines metadata associated with detected topics. Root-event topics Food 204 and Sport 206 define different event topics or activities, wherein the Food topic 204 comprehends a hierarchy of different branch food categories (here noodle 208, rice 210, pizza 212 and fast food 214, though others not shown may be included), and the Sport topic comprehends a hierarchy of different branch sports activities (basketball 216, baseball 218, running 220, etc.). The branch topics each depend further into leave nodes: in the present example, the noodle branch node 208 is linked to different specific noodle dishes beef noodle 222 and ramen 224, etc. The present example is illustrative but not limiting or exhaustive, and in other examples the food topic 204 is linked to different food-related activities (for example, dining out, shopping for groceries, cooking, etc.) and the Sport topic 206 comprehends sports activity-related locations (for example, an arena for attending a professional sporting event, a gymnasium for working out, etc.).

In the present example, the configured processor identifies the extracted text content phrase "beef noodle" as a topic leaf node keyword 222 that is linked to branch node "noodle" 208 and root event topic "food" 204 within the event taxonomy 202, and thereby generates the following JSON output object for the related keywords:

```
{
    "user_id" : "abc123@BigCorp.com ",
    "time": "1416995016",
    "tag": ["food", "beef," "noodle" , "beef noodle"],
    "location" : {latitude: 25.1, longitude: 123.1}
}
```

Thus, the "tag" data in the above example comprises topic keywords ("beef," "noodle" and "beef noodle") identified at 104 from the message content extracted at 102, and the keyword "food" identified as a root event-topic of the "noodle" and "beef noodle" keywords within the event taxonomy hierarchy illustrated in FIG. 5.

Referring again to FIG. 4, at 106 the configured processor identifies a set of one or more potential recommendation items that are linked to the topic leaf node and/or branch node keywords and match or satisfy a type of event of the root event node; in some embodiments, the potential recommendation items and meet location or other selection constraints (boundaries, thresholds, etc.). The recommendation items are points of interest (locations, people, subjects, activities, etc.) that are linked to the taxonomy topics as appropriate for recommendation at 106 in satisfaction of the respective linked topic keywords. Thus, the event root nodes 204 and 206 of each event type are associated with respective keyword branch and leaf nodes, enabling the configured processor to accelerate speeds of topic detection and reduce the scope of searching for recommended points of interest, relative to other prior art processes that do not use an event taxonomy hierarchy according to the present invention. The nodes within the taxonomy are linked with one or more recommendation points of interest that may satisfy the associated node keyword, including considered in combination with other related keywords. In the present example, the configured processor identifies at 106 three recommendation points of interest which are restaurants that each match the food topic node 204 event type (dining establishment) and are linked to the beef noodle leaf node 222 as serving "beef noodle" dishes: Ling Dong Fang, Lau Deng, and Santou.

The Interests Database 105 is dynamic and constantly updated by the configured processor (or service providers or other entities) with latest trends and internet activity, enabling recommendation at 106 of events selected as most currently preferred or relevant to different topics/point of interests. Thus, the configured processor makes recommendations for topic that extend beyond static, stored topic links to encompass latest trends on the internet, current social media ratings and rankings and "likes," etc.

In some examples the identification of the three is further dependent upon each recommendation meeting boundary values that include having social media user ratings that meet a minimum standard (for example, three stars on a five-star rating standard); having an average cost that meets a cost standard (for example, an average meal price at or below a moderate price standard); and/or being located within a threshold minimum proximity (distance, estimated travel time, etc.) to each of the message sender and recipients.

At 108 the configured processor determines sentiment values for the message sender and each target recipient for each of the potential recommendation items as a function of preferences and sentiments indicated within respective preference profiles that are stored in (or acquired by) a preference profile repository 107. In the present example, the configured processor identifies generates the following first JSON object output at 106 for a preference sentiment value of the sender of the message:

```
{
"user_id" : "abc123@BigCorp.com",
"display_name" : "stone",
"time" : "1416995016",
"historic message content" : "I don't like Santou, either",
"tag" : ["beef noodle" , "Santou" , "unlike"],
"app_type" : "WHATSAPP"
}
```

This first preference JSON example is generated in response to preference profile data for the sender that includes previous WHATSAPP chat text associated with the "beef noodle" keyword phrase, wherein the sender expressed negative sentiment with regard to beef noodle dishes served by the potential recommendation item restaurant named "Santou."

The configured processor further generates the following second preference JSON object preference sentiment value output at 106 for the sender of the message

```
{
"user_id" : "abc123@BigCorp.com",
"preference" : {
"food": {
"beef noodle": ["LinDongFang"],
"burger": ["BurgerQueen", "MacDonDon", "Sandy's"],
"sandwich": ["Quizyes", "Submarine"]
},
"drink": {
"soft drink": ["ABC Coke", "XYZ Root Beer"],
"beer": [ ]
}
}
}
```

This second JSON example indicates that for the general "food" category node 204 the sender prefers (likes) the potential recommendation item restaurant "Lin Dong Fang" for dining for the "beef noodle" topic node 222; "BurgerQueen", "MacDonDon" and "Sandy's" for "burger" dishes; "Quizyes" and "Submarine" for general "sandwich" category dining. For the general "drink" category, the sender prefers (likes) "ABC Coke" and "XYZ Root Beer" for the subcategory of "soft drink", and no preferences are indicated for the subcategory of "beer".

At 110 the configured processor arbitrates the sentiment values determined at 108 to select one or recommendations from the set of potential recommendation items to satisfy the identified topic subjects and keywords that meet sentiment thresholds in view of the preference profile data. Thus, arbitration determines consensus recommendations at 110 as those of the potential items that are minimally acceptable to each of the sender and recipients.

In some aspects, the configured processor calculates topic scores from sentiment "positiveness" and "negativeness" values for each participant at 108, and adds them together for each possible/potential recommendation and compares them to a threshold value at 110 that represents a minimum satisfactory score to qualify as a recommendation confidence value for a consensus decision. In one example participants A, B, and C exchange messages discussing whether they should play basketball at 8 am on Sunday morning, wherein the configured processor identifies a topic instance at 104 of {"basketball", "8 am on Sunday morning" }, and determines at 108 a positive sentiment value of positive (plus) one and a negative sentiment value of negative (minus) one for each possible location recommendation or attribute thereof (for example, free parking=+1, paid parking=−1) for potential locations identified at 106 for each of the three participants and adds them together. For a consensus threshold topic score of three, the configured processor will not recommend any location which has a negative sentiment for any one of the three, as this will drop the resulting topic score below the value of 3. Thus, when the sentiments of A, B, C agree on the proposed topic, the total topic score is calculated as 3, which means the consensus decision is made. However, if only A and C agree on one possible recommendation but B disagrees (as indicated by their preference profile data), the resulting topic score is 2, which means the profile data for A, B, C does not indicate a consensus decision recommendation on this possible location at 110.

With respect to the "beef noodle" JSON examples above, in one example embodiment the configured processor determines at 110 a positive sentiment value of positive (plus) one for sentiment data for each of the plurality of different potential restaurants that serve beef noodle dishes in response to indications within the profile data that a user finds the restaurant acceptable, and a negative sentiment value of negative (minus) one for indications that the message sender or recipient finds a given restaurant disfavored or unacceptable, adds them together and compares to consensus topic score threshold. If the threshold value is less than a total number of participants (for example, a threshold of three for five participants), the configured processor recommends one of the potential restaurants even if two of five participants have negative sentiment values, which enables users with negative sentiments to change their mind, or to be overruled by a majority of the other participants.

Thus, in one example, the configured processor generates and returns the following JSON recommendation output object to the social media or messaging application of the message that identifies the type of result (recommendation), the identity of the point of interest satisfying the search result, and the geographic location of the recommended point of interest:

```
{
  "result_type" : "Recommendation",
  "result" : "Ling Dong Fang Beef Noodle",
  "location" : {latitude: 25.1, longitude: 123.1}
}
```

At 112 the configured processor presents the recommendation(s) determined at 108 to one or more, or all, of the participants (the sender and each recipient), for example within a pop-up window of a graphical user interface (GUI) display screen of a smart phone of personal computing device of each participant, optionally rank-ordering the recommendations from best or most appropriate recommendation through least. Thus, in the present example the configured processor presents a list of restaurants ranked as a function of strength of sentiment topic score, and optionally other criteria (average distance to current locations of the participants, social network ratings, internet database ratings and/or average meal pricing, etc.) and presents the following rank-ordered listing of restaurants to each participant in the message service receiving or sending the message: "1. Ling Dong Fang Beef Noodle, 2. Lau Deng Beef Noodle, and 3. Santou Beef Noodle." The negative sentiment value determined for the message sender with respect to Santou Beef Noodle in the first JSON example above results in a lower score than the Ling Dong Fang and Lau Deng restaurant options, and the expressly positive sentiment value allocated to the sender for Ling Dong Fang Beef Noodle for "beef noodle" dishes results in this choice having a highest "positiveness" value relative to the other choices, being ranked first, or most preferred over the others in a presentment to the sender or recipients of the message of step 101.

In response to determining at 114 a failure of the message sender and recipients to agree on one of the recommendations, the configured processor returns to process step 104 to (iteratively) revise the topic keywords identified as relevant to message text content, the set of potential recommendation items identified at 106, and the sentiment values determined at 108 as a function of negative or positive feedback values recognized at 114 from text replies of one or more of the sender and recipients to the recommendations, including from their express rejections of any ones of the recommended items, in order to arbitrate the revised sentiment values at 110 to generate and present another set of recommendations at 112 to the sender and recipients. When a topic is continuously discussed between all, or has been historically discussed in prior conversations, each participant may express individual opinions that overtly or inherently convey positive or negative sentiments used by the configured processor (via repetitions of the steps 114-104-106-108-110-112) to iteratively refine recommendations presented to the sender and recipients, as well as the topic subject and keywords identified and used to generate the recommendations.

In response to a consensus selection or confirmation of one of the displayed recommendations at 114, at 116 the configured processor automatically generates and sends an invitation to each participant to meet at the selection at a time and date indicated directly (chosen) by the participants or determined to satisfy profile preference data boundary conditions. Generally, a valid event includes attendees (who), date/time (when), location (where) and subject (what). For example, in response to recognizing a reply message of "How about 6 pm?" followed by confirmations by each participant ("OK", "K", "Great", "Yes", etc.), the configured processor generates and sends an appointment invitation to each participant to meet at the consensus selection (in some examples the top-ordered choice as default if no other choices are affirmatively made) for the current date at 6 pm. Alternatively, in response to parsing a text reply at 114 of "great, lets meet for lunch", the configured processor may also directly compose or generate an invitation with a default meeting time of 12:15 PM at the restaurant as a function of meeting profile preference data boundary conditions, wherein the profile data indicates that the sender and recipients each break for lunch at noon, and in response to determining that the longest estimated travel time for any of the participants from their current locations to the selected restaurant is fifteen minutes.

In the present example, the configured processor generates and sends at 116 the following JSON object invitation from the originating sender:

```
{
"user_id" : "abc123@BigCorp.com",
"time" : "1416995016",
"subject" : "Beef Noodle Party",
"attendee" : ["xyz321@BigCorp.com", "def987@deptX.org"],
"place": "Ling Dong Fang Beef Noodle"
}
```

In this example the other recipients are identified as unique, invited attendees by their user names on the present messaging services, which are different respective and unique email addresses "xyz321@BigCorp.com" and "def987@deptX.org".

In response to determining at 118 that the invitation is not accepted, the configured processor returns to step 104 to repeat the subsequent steps as described above. Else, in response to determining that the invitation is accepted by a participant at 118, or otherwise that a default consensus acceptance condition is met, at 120 the configured processor ends the process by creating a calendar entry for the accepted appointment on a calendar application of the accepting participant. In example the configured processor creates and sends the following JSON object to the calendar application of the accepting participant:

```
{
"result_type" : "Invitation",
"result_topic" : "Beef Noodle Party",
"result_place" : "LinDongFang Beef Noodle"
"location" : {latitude: 25.2, longitude: 123.3}
}
```

The configured processor also updates the preference profile data 107 of the participants at 120, for example, creating positive sentiment values for the selection in response to acceptance of the invitation to meet and eat at the recommendation, negative sentiment values for message content that indicates that the participant does not like the recommendation, etc.

Figure 6:
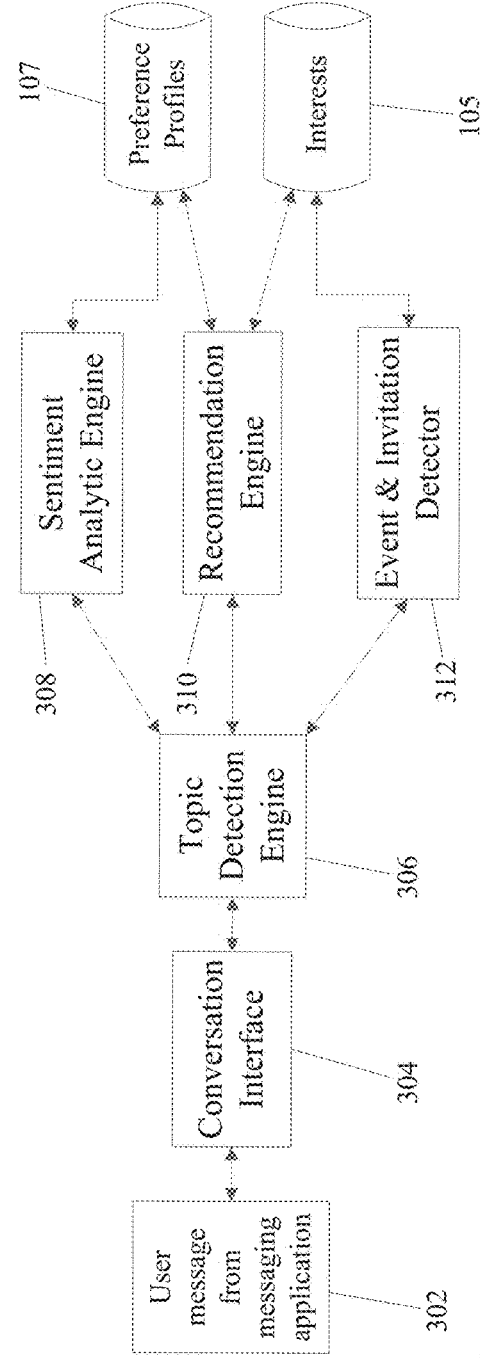
FIG. 6 a block diagram illustration of an embodiment of the present invention.

FIG. 6 illustrates an implementation of the present invention. One or more processors configured according to an aspect of the present invention ("configured processors") provide respective Conversation Interface 304, Topic Detection Engine 306, Sentiment Analytic Engine 308, Recommendation Engine 310 and Event and Invitation Detector 312 structures that may be implemented in accordance with the computer system server 10 of FIG. 3, including as cloud nodes 10 of FIG. 1, as described respectively above.

The Conversation Interface 304 provides REST API service to trigger conversation analysis. When a social conversation starts on a given social media application or mobile instant message app. (as recognized at 101, FIG. 4), the Conversation Interface 304 obtains inputs of snippets of the conversation (sentences, phrases, etc.), generally in a JSON format, and provides REST API service to trigger conversation analysis to generate (at 102, FIG. 4) a JSON or other representation of the message data inclusive of the sender's unique user account identity, a user name of the sender that is seen by the others within their respective message displays, time of sender submission or transmission/reception to the other users of the message, message content data, messaging application used to convey the message to the other users, and geographic location of the sender or desired meeting location, etc.

The Topic Detection Engine 306 identifies, extracts or otherwise detects topic keywords within the Interests Database 105 taxonomy that are relevant to the message text content keywords, or are related thereto via the taxonomy (as at 104, FIG. 4).

The Recommendation Engine 310 processes JSON objects outputted by the Topic Detection Engine 306 to identifies potential recommendation items (points of interest) linked to the topics of the keywords within the Interests 105 taxonomy that match or satisfy the identified topic subjects and keywords and meet location or other selection constraints (boundaries, thresholds, etc.) (as at 106, FIG. 4).

The Sentiment Analytic Engine 308 determines the preferences of the different users as a function of the identified topic keywords (at 106, FIG. 4), and identifies sentiment values for the message sender and each target recipient for each of the potential recommendation items as a function of preferences and sentiments indicated within their respective preference profiles stored in (acquired by) the Preference Profile repository 107 (at 108, FIG. 4). The Sentiment Analytic Engine 308 determines preference values and sentiment dynamically and in response to analysis of a current, ongoing conversation of the message recipients, updates the Preference Profile repository 107 preference data (at 108 and 120, FIG. 4) for the recipients accordingly.

The Event & Invitation Detector 312 generates and sends invitations to all conversation participants via an appropriate social media platform or mobile instant messaging app system, in response to detecting agreement to attend a suggested event, or to creating a possible event from group messaging content (see 116, FIG. 4).

Mobile communication channels provide instant connectivity between multiple people anywhere at any time, generating casual conversation content that contains useful but unorganized and unstructured information that is difficult to separate from noise signals. Aspects of the present invention provide advantages over the prior art by utilizing social text mining techniques to extract important information from social conversation platforms and web-based social media that is used to automatically generate (via specifically configured computerized devices) personalized recommendations that help facilitate decision making among the members of the group or individuals involved within a conversation.

Additionally, by recording preference determinations to the Preference Profile 107 structure use in future recommendation iterations, aspects improve efficiencies: disfavored choices are not suggested again, or are ranked lower in future recommendation lists, facilitating faster, more efficient group decision making processes in subsequent iterations. Users also generally appreciate the accuracy of system outputs, and feel respected and valued, when aspects provide recommendations that correspond to preferences provided to the systems, devices and services of the present invention. Aspects provide an intelligent system and method to offer personalized/group recommendations within social conversation or mobile chatting applications where many topics are discussed interchangeably, detecting topics from conversation snippets among participants, and then generating recommendations appropriate for all participants (as indicated by their individual preferences). When participants discuss recommendation topics, platforms according to the present invention analyze sentiment from conversation snippets and determine whether a consensus conclusion exists. Once a consensus decision is made, the platforms automatically generate and send invitations to all participants.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommendation generation in response to messaging content, comprising executing on a computer processor:
   in response to receipt of a message from a messaging application that is directed from a sender to a recipient within the messaging application, extracting text content from the received message;
   identifying a keyword within the extracted text content that is assigned to a topic leaf node within an event taxonomy;
   identifying a root event node within the event taxonomy from which the topic leaf node depends within the event taxonomy;
   identifying a plurality of recommendation items that each match a type of event of the root event node and are linked to the topic node of the identified keyword;
   determining, for each of the recommendation items, a sender sentiment value as a function of a preference of the sender, and a recipient sentiment value as a function of a preference of the recipient;
   presenting to the sender and the recipient as an event recommendation a subset of the recommendation items that each satisfy a sentiment threshold for the sender sentiment value and the recipient sentiment value, comprising: assigning one of a positive sentiment value and a negative sentiment value to each of the recommendation items for the sender as a function of a respective preferences indicated by the sender with respect to each of the recommendation items, assigning one of the positive sentiment value and the negative sentiment value to each of the recommendation items for the recipient as a function of a respective preferences indicated by the recipient with respect to each of the recommendation items, for each of the recommendation items, generating consensus sentiment values by adding respective ones of the sentiment values assigned for the sender and the recipient, and selecting and presenting to the sender and recipient as the event recommendation a subset of the recommendation items that each have consensus sentiment values that meet or exceed a sentiment threshold value;

in response to determining that the sender and recipient have not agreed on selection of the event recommendation subset items presented to the sender and recipient, updating preference profile data of the sender and the recipient with negative sentiment values for each of the presented event recommendation subset items; and iteratively repeating, until the sender and recipient agree on selection of a recommendation item presented within a current event recommendation subset, assigning positive or negative sentiments value to each of the recommendation items as a function of the updated preference profile data of the sender and the recipient, generating the consensus sentiment values for the sender and the recipient, and presenting to the sender and the recipient as the event recommendation the subset of the recommendation items that each satisfy the sentiment threshold for the sender sentiment value and the recipient sentiment value.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the extracting the text content from the received message, the identifying the keyword within the extracted text content that is assigned to the topic leaf node within the event taxonomy, the identifying the root event node within the event taxonomy from which the topic leaf node depends within the event taxonomy, the identifying the plurality of recommendation items that each match the type of event of the root event node and are linked to the topic node of the identified keyword, the determining for each of the recommendation items the sender sentiment value, and the presenting to the sender and the recipient the event recommendation subset of the recommendation items.

3. The method of claim 2, wherein the computer-readable program code is provided as a service in a cloud environment.

4. The method of claim 1, wherein the respective preferences indicated by the recipient and the sender with respect to each of the recommendation items are selected from the group consisting of:

historic preference data expressed by the sender or recipient with respect to the recommendation items and saved to preference profile data of the sender or recipient; and current preferences expressed within text content extracted from a current message conversation between the sender and recipient that includes the message received from the messaging application.

5. The method of claim 4, further comprising:

presenting the event recommendation subset of the recommendation items to the sender and recipient in a rank ordering as a function of relative differences in their respective consensus sentiment values.

6. The method of claim 5, further comprising:

selecting the event recommendation subset of the recommendation items in response to determining that each of the event recommendation subset items meet a boundary condition that is selected from the group consisting of having a social media user rating that meets a minimum social media rating threshold, having an average cost that meets a cost threshold, and being located within a threshold minimum proximity to each of the sender and recipient as a function of a parameter, wherein the parameter is selected from the group consisting of travel distance and estimated travel time.

7. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

extracts text content from a received message in response to receipt of the message from a messaging application that is directed from a sender to a recipient within the messaging application;

identifies a keyword within the extracted text content that is assigned to a topic leaf node within an event taxonomy;

identifies a root event node within the event taxonomy from which the topic leaf node depends within the event taxonomy;

identifies a plurality of recommendation items that each match a type of event of the root event node and are linked to the topic node of the identified keyword;

determines, for each of the recommendation items, a sender sentiment value as a function of a preference of the sender, and a recipient sentiment value as a function of a preference of the recipient;

presents to the sender and the recipient as an event recommendation a subset of the recommendation items that each satisfy a sentiment threshold for the sender sentiment value and the recipient sentiment value, which assigns one of a positive sentiment value and a negative sentiment value to each of the recommendation items for the sender as a function of a respective preferences indicated by the sender with respect to each of the recommendation items, assigns one of the positive sentiment value and the negative sentiment value to each of the recommendation items for the recipient as a function of a respective preferences indicated by the recipient with respect to each of the recommendation items, for each of the recommendation items, generates consensus sentiment values by adding respective ones of the sentiment values assigned for the sender and the recipient, and selects and presents to the sender and recipient as the event recommendation a subset of the recommendation items that each have consensus sentiment values that meet or exceed a sentiment threshold value;

in response to determining that the sender and recipient have not agreed on selection of the event recommendation subset items presented to the sender and recipient, updates the preference profile data of the sender and the recipient with negative sentiment values for each of the presented event recommendation subset items;

in response to determining that the sender and recipient have not agreed on selection of the event recommendation subset items presented to the sender and recipient, updates the preference profile data of the sender and the recipient with negative sentiment values for each of the presented event recommendation subset items; and iteratively repeats, until the sender and recipient agree on selection of a recommendation item presented within a current event recommendation subset, assigning the positive or negative sentiments value to each of the recommendation items as a function of the updated preference profile data of the sender and the recipient, generating the consensus sentiment values for the sender and the recipient, and presenting to the sender and the recipient as the event recommendation the subset of the recommendation items that each satisfy the sentiment threshold for the sender sentiment value and the recipient sentiment value.

8. The system of claim 7, wherein the respective preferences indicated by the recipient and the sender with respect to each of the recommendation items are selected from the group consisting of:

historic preference data expressed by the sender or recipient with respect to the recommendation items and saved to preference profile data of the sender or recipient; and current preferences expressed within text content extracted from a current message conversation between the sender and recipient that includes the message received from the messaging application.

9. The system of claim 8, wherein the processor executes the program instructions stored on the computer-readable storage medium via the computer readable memory and thereby presents the event recommendation subset of the recommendation items to the sender and recipient in a rank ordering as function of relative differences in their respective consensus sentiment values.

10. The system of claim 9, wherein the processor executes the program instructions stored on the computer-readable storage medium via the computer readable memory and thereby selects the event recommendation subset of the recommendation items in response to determining that each of the event recommendation subset items meet a boundary condition that is selected from the group consisting of: having a social media user rating that meets a minimum social media rating threshold, having an average cost that meets a cost threshold, and being located within a threshold minimum proximity to each of the sender and recipient as a function of a parameter, wherein the parameter is selected from the group consisting of: travel distance and estimated travel time.

11. A computer program product for recommendation generation in response to messaging content, the computer program product comprising:

a computer readable storage medium having computer readable program code embodied therewith, wherein the computer readable storage medium is not a transitory signal per se, the computer readable program code comprising instructions for execution by a processor that cause the processor to:

extract text content from a received message in response to receipt of the message from a messaging application that is directed from a sender to a recipient within the messaging application;

identify a keyword within the extracted text content that is assigned to a topic leaf node within an event taxonomy;

identify a root event node within the event taxonomy from which the topic leaf node depends within the event taxonomy;

identify a plurality of recommendation items that each match a type of event of the root event node and are linked to the topic node of the identified keyword;

determine, for each of the recommendation items, a sender sentiment value as a function of a preference of the sender, and a recipient sentiment value as a function of a preference of the recipient;

present to the sender and the recipient as an event recommendation a subset of the recommendation items that each satisfy a sentiment threshold for the sender sentiment value and the recipient sentiment value, which comprises: assigning one of a positive sentiment value and a negative sentiment value to each of the recommendation items for the sender as a function of a respective preferences indicated by the sender with respect to each of the recommendation items, assigning one of the positive sentiment value and the negative sentiment value to each of the recommendation items for the recipient as a function of a respective preferences indicated by the recipient with respect to each of the recommendation items, for each of the recommendation items, generating consensus sentiment values by adding respective ones of the sentiment values assigned for the sender and the recipient, and selecting and presenting to the sender and recipient as the event recommendation a subset of the recommendation items that each have consensus sentiment values that meet or exceed a sentiment threshold value;

in response to determining that the sender and recipient have not agreed on selection of the event recommendation subset items presented to the sender and recipient, update preference profile data of the sender and the recipient with negative sentiment values for each of the presented event recommendation subset items; and iteratively repeat, until the sender and recipient agree on selection of a recommendation item presented within a current event recommendation subset, assigning the positive or negative sentiments value to each of the recommendation items as a function of the updated preference profile data of the sender and the recipient, generating the consensus sentiment values for the sender and the recipient, and presenting to the sender and the recipient as the event recommendation the subset of the recommendation items that each satisfy the sentiment threshold for the sender sentiment value and the recipient sentiment value.

12. The computer program product of claim 11, wherein the respective preferences indicated by the recipient and the sender with respect to each of the recommendation items are selected from the group consisting of:

historic preference data expressed by the sender or recipient with respect to the recommendation items and saved to preference profile data of the sender or recipient; and current preferences expressed within text content extracted from a current message conversation between the sender and recipient that includes the message received from the messaging application.

13. The computer program product of claim 12, wherein the computer readable program code instructions for execution by the processor further cause the processor to present the event recommendation subset of the recommendation items to the sender and recipient in a rank ordering as function of relative differences in their respective consensus sentiment values.

14. The computer program product of claim 13, wherein the computer readable program code instructions for execution by the processor further cause the processor to select the event recommendation subset of the recommendation items in response to determining that each of the event recommendation subset items meet a boundary condition that is selected from the group consisting of: having a social media user rating that meets a minimum social media rating threshold, having an average cost that meets a cost threshold, and being located within a threshold minimum proximity to each of the sender and recipient as a function of a parameter, wherein the parameter is selected from the group consisting of travel distance and estimated travel time.

* * * * *